United States Patent [19]

Auchter et al.

[11] Patent Number: 4,904,724

[45] Date of Patent: Feb. 27, 1990

[54] PREPARATION OF AQUEOUS POLYMER DISPERSIONS

[75] Inventors: Gerhard Auchter, Mannheim; Gerhard Neubert, Battenberg, both of Fed. Rep. of Germany

[73] Assignee: BASF Aktiengesellschaft, Ludwigshafen, Fed. Rep. of Germany

[21] Appl. No.: 285,667

[22] Filed: Dec. 16, 1988

[30] Foreign Application Priority Data

Dec. 18, 1987 [DE] Fed. Rep. of Germany ....... 3743040

[51] Int. Cl.$^4$ ............................................. C08F 2/16
[52] U.S. Cl. .................................. 524/458; 524/460
[58] Field of Search ................ 524/460, 458; 525/193, 525/301, 285

[56] References Cited

U.S. PATENT DOCUMENTS

| | | | |
|---|---|---|---|
| 3,244,655 | 4/1966 | Sullivan et al. | 524/460 |
| 4,151,143 | 4/1979 | Blank et al. | 524/533 |
| 4,645,783 | 2/1987 | Kinoshita | 524/460 |

FOREIGN PATENT DOCUMENTS 3123598 12/1982 Fed. Rep. of Germany.
3543361 6/1987 Fed. Rep. of Germany.

*Primary Examiner*—Joseph L. Schofer
*Assistant Examiner*—Jeffrey T. Smith

*Attorney, Agent, or Firm*—Oblon, Spivak, McClelland, Maier & Neustadt

[57] ABSTRACT

Aqueous polymer dispersions are prepared by free radical polymerization of
  (a) from 50 to 100%, based on the total weight of the monomers, of $C_1$–$C_{20}$-alkyl (meth)acrylates,
  (b) from 0 to 20%, based on the total weight of the monomers, of polyolefinically unsaturated monomers and
  (c) from 0 to 30%, based on the total weight of the monomers, of further monoolefinically unsaturated monomers in aqueous emulsion in the presence of a preformed solution copolymer (A) dispersed in water and obtained from
  (I) 1.5–15%, based on its weight, of monomers of 3 to 10 carbon atoms which contain a carboxyl or carboxylic anhydride group,
  (II) 30–98.5%, based on its weight, of $C_1$–$C_{20}$-alkyl acrylates or methacrylates,
  (III) 0–60%, based on its weight, of vinylaromatics,
  (IV) 0–20%, based on its weight, of monoolefinically unsaturated carbonyl compounds and
  (V) 0–20%, based on its weight, of further monomers not stated under (I) to (IV)

and a solution copolymer (B) obtained from 40–100%, based on its weight, of monomers (II) and 0–60%, based on its weight, of monomers (III) to (V).

4 Claims, No Drawings

PREPARATION OF AQUEOUS POLYMER DISPERSIONS

It has long been an aim to provide, as film formers for coatings, aqueous polymer dispersions which dry to give particularly water-resistant films.

The conventional process for the preparation of polymer dispersions is emulsion polymerization, in which hydrophilic assistants (emulsifiers and/or protective colloids) are used in order to ensure the stability of the dispersion. These assistants always make the films produced from the dispersions somewhat sensitive to water.

U.S. Pat. No. 4,151,143 and German Laid-Open Applications DOS 3,123,598 and DOS 3,632,617 describe emulsion polymerization processes in which anionic, in particular carboxyl-containing, polymers are used as emulsifiers or protective colloids in an aqueous medium; after drying, the said polymers have relatively poor hydrophilic properties, although the water resistance of the films is still unsatisfactory. Furthermore, the coatings produced from these polymer dispersions have to be baked in order to achieve useful properties, and it may be necessary also to use a crosslinking agent.

Another method for the preparation of polymer dispersions which give water-resistant films is disclosed in German Laid-Open Application DOS 3,543,361, which describes secondary dispersions which are obtainable from a polymer which is dispersed in water with the addition of ammonia and consists of two components, one of which contains carboxyl groups. At as low as room temperature and without the addition of a crosslinking agent, these secondary dispersions give films having very high water resistance. A remaining disadvantage, however, is the high thermoplasticity of the films obtainable from these secondary dispersions.

We have found that aqueous polymer dispersions can be advantageously prepared by free radical polymerization of (a) from 50 to 100%, based on the total weight of the monomers, of $C_1-C_{20}$-alkyl (meth)acrylates, (b) from 0 to 20%, based on the total weight of the monomers, of polyolefinically unsaturated monomers and (c) from 0 to 30%, based on the total weight of the monomers, of further monoolefinically unsaturated monomers in aqueous emulsion at from 20° to 100° C. in the presence of preformed copolymers dispersed in water, if from 20 to 80% by weight, based on the sum of the weights of all the monomers and of the copolymers, of a mixture, dispersed in water, of from 30 to 90% by weight of the mixture of a solution copolymer (A) prepared in organic solvents and obtained from (I) 1.5-15%, based on its weight, of monomers of 3 to 10 carbon atoms which contain a carboxyl or carboxylic anhydride group, (II) 30-98.5%, based on its weight, of $C_1-C_{20}$-alkyl acrylates or methacrylates, (III) 0-60%, based on its weight, of vinylaromatics, (IV) 0-20%, based on its weight, of monoolefinically unsaturated carbonyl compounds and (V) 0-20%, based on its weight, of further monomers not stated under (I) to (IV) and from 10 to 70% by weight of the mixture of a solution copolymer (B) obtained from 40-100%, based on its weight, of monomers (II) and 0-60%, based on its weight, of one or more of the monomers (III) to (V) are used as the preformed copolymers.

The dispersions prepared according to the invention are distinguished in particular by good leveling properties, a low minimum film-forming temperature in relation to film hardness, high gloss, good mechanical properties and, especially, good water resistance of the films prepared from them and dried at room temperature.

It is particularly surprising that important dispersion properties, such as viscosity, particle size distribution, freedom from coagulates, gloss and leveling properties of the films can be substantially better reproduced with the dispersions prepared according to the invention than when the carboxyl-free component (B) is not used. The reason for this is not known. However, it is presumed that these advantages are a result of the particularly good monomer swellability of the secondary dispersions, which have a high content of hydrophobic polymer.

Suitable monomers (a) are the esters of acrylic acid or methacrylic acid with straight-chain or branched alkanols of 1 to 20 carbon atoms, e.g. methyl acrylate, methyl methacrylate, ethyl acrylate, ethyl methacrylate, isopropyl acrylate, n-butyl acrylate, n-butyl methacrylate, isobutyl acrylate, isobutyl methacrylate, tert-butyl acrylate, 2-ethylhexyl acrylate and 2-ethylhexyl methacrylate, as well as lauryl acrylate and stearyl acrylate. n-Butyl acrylate and methyl methacrylate are preferred. The proportion of monomers (a) is preferably from 70 to 90% by weight, based on the monomers to be polymerized.

Particularly suitable polyolefinically unsaturated monomers (b) are diacrylates and dimethacrylates of alkanediols of, in general, 1 to 8 carbon atoms, such as glycol diacrylate and dimethacrylate, butane-1,4-diol diacrylate and dimethacrylate, hexane-1,6-diol diacrylate and dimethacrylate, octane-1,8-diol diacrylate and dimethacrylate, as well as divinylbenzene, diallyl phthalate, butadiene and trimethylolpropane triacrylate or trimethacrylate, and pentaerythritol triacrylate or tetraacrylate. The monomers (b) are preferably used in an amount of from 5 to 15% by weight, based on the total amount of monomers to be polymerized.

Examples of suitable monomers (c) are monoacrylates and monomethacrylates of alkanediols of, in general, 1 to 8 carbon atoms, such as β-hydroxyethyl acrylate and methacrylate, 2-hydroxypropyl acrylate and methacrylate and butane-1,4-diol monoacrylate and monomethacrylate, acrylonitrile and methacrylonitrile, acrylamide, methacrylamide, vinyl esters, such as vinyl acetate, vinyl propionate and vinyl laurate, vinyl ethers, such as vinyl isobutyl ether, and diesters of monoolefinically unsaturated dicarboxylic acids, such as maleic acid, itaconic acid, citraconic acid or mesaconic acid, with alkanols of 1 to 20 carbon atoms which may contain ether or thioether groups, and furthermore monoolefins of 3 to 10 carbon atoms, such as propene, butene, hexene, pentene or isobutene, and vinylaromatics. Other suitable monomers (c) are the monomers (IV).

The solution copolymers (A) and (B) dispersed in water can be prepare as described in German Laid-Open Application DOS 3,543,361. In this context, the following may be stated specifically:

Suitable components (I) are copolymerizable olefinically unsaturated organic compounds of 3 to 10 carbon atoms having one or more carboxyl or carboxylic anhydride groups, such as acrylic acid, methacrylic acid, crotonic acid, maleic acid, itaconic acid or the anhydrides or half-esters of the dicarboxylic acids. Before being neutralized with ammonia, the anhydride groups of the copolymers can be converted into the corresponding halfester groups, for example by heating with glycol ethers or alkanols of 1 to 8 carbon atoms. Examples of such alkanols or glycol ethers are ethanol, isopropanol, butanol and butylglycol. Preferred components (I) are acrylic acid, methacrylic acid and itaconic acid. Component (I) is present as polymerized units in the copolymer (A) in amounts of from 1.5 to 15, preferably from 5 to 12, % by weight.

Examples of suitable esters of acrylic acid or methacrylic acid (II) with straight-chain or branched alkanols of 1 to 20 carbon atoms are methyl acrylate and methacrylate, ethyl acrylate, isopropyl acrylate, n-butyl acrylate, n-butyl methacrylate, isobutyl acrylate, isobutyl methacrylate, tert-butyl acrylate, 2-ethylhexyl acrylate, 2-ethylhexyl methacrylate, lauryl acrylate and mixtures of these. n-Butyl acrylate and methyl methacrylate are preferred. Component (II) is present in the copolymer (A) in an amount of from 30 to 98.5, preferably from 45 to 95, % by weight.

Suitable components (III) are vinylaromatics of 8 to 12 carbon atoms, such as styrene, α-methylstyrene, vinyltoluenes and tert-butylstyrene, as well as halostyrenes. Styrene is preferred. Component (III) can be used in the copolymer (A) in an amount of up to 60% by weight. Where it is present, amounts of from 20 to 45% by weight have proven useful.

Examples of suitable monoolefinically unsaturated carbonyl compounds (IV) are α, β-monoolefinically unsaturated aldehydes and/or ketones, such as acrolein, methacrolein, vinyl alkyl ketones where alkyl is of 1 to 20 carbon atoms, formylstyrene, (meth)acryloxyalkanals and -alkanones, whose preparation is described in, for example, German Laid-Open Application DOS 2,722,097, N-oxoalkyl(meth)acrylamide, as described in, inter alia, U.S. Pat. No. 4,226,007 and German Laid-Open Applications DOS 2.061,213 and DOS 2.207,309, e.g. N-3-oxobutylacrylamide and -methacrylamide, N-1,1-dimethyl-3-oxobutyl(meth)acrylamide, diacetone(meth)acrylamide and N-3-oxo-1,1-dibutyl-2-propylhexylacrylamide, as well as acetonyl (meth)acrylate and diacetone (meth)acrylate, acrylamidopivalaldehyde and mixtures of these comonomers. 3-Oxoalkyl (meth)acrylates and N-3-oxoalkyl(meth)acrylamides are preferred. Component (IV) can be present in the copolymer (A) in an amount of up to 20% by weight. Where it is present, amounts of from 2 to 15% by weight are preferred.

Components (V) are further olefinically unsaturated monomers not mentioned under (I) to (IV), for example mono(meth)acrylates or alkanediols, such as hydroxyethyl and hydroxypropyl (meth)acrylate and butanediol mono(meth)acrylate, (meth)acrylamide and/or (meth)acrylonitrile. If required, these monomers can be used to achieve special properties. Other suitable components (V) are vinyl ethers, vinyl esters, such as vinyl acetate and vinyl propionate, diesters of maleic acid, itaconic acid, citraconic acid or mesaconic acid with alkanols of 1 to 20 carbon atoms, which may contain ether or thioether groups, and furthermore monoolefins of 3 to 10 carbon atoms, such as propene, butene, isobutene, pentene and hexene, and diolefins, such as butadiene and isoprene.

The copolymer (B) does not contain any copolymerized monomers (I). The monomers (II) are present as polymerized units in the copolymer (B) in an amount of from 40 to 100, preferably from 45 to 98, % by weight. The monomers (III) to (V) furthermore mentioned for copolymer (A) are present as polymerized units in copolymer (B) in amounts of from 0 to 60% by weight or, where it is present, preferably in amounts of from 2 to 55% by weight. Of this, from 2 to 15% by weight are preferably component (IV).

The copolymers (A) and (B) are prepared by polymerization in organic solution. The solution polymerization process is thoroughly familiar to the skilled worker, so that the suitable conditions need not be discussed further here. The solution polymerization can be carried out, for example, in the presence of from 0.3 to 5, preferably from 0.5 to 3, % by weight, based on the sum of the monomers, of free radical initiators, such as azobiscarboxamides, axobiscarboxylic acid nitriles or peroxides, in general at from 50° to 150° C., preferably from 80° to 130° C., if required in the presence of from 0 to 3% by weight, based on the sum of the monomers, of regulators, such as mercaptoethanol, tert-dodecyl mercaptan or diisopropylxanthogen disulfide. Suitable organic solvents are in principle all commonly used solvents which dissolve the novel copolymer. Butanol, isobutanol, propanol, ethanol and toluene and mixtures of these are preferred.

It is not important as such whether the copolymer (A) is prepared first, followed by the copolymer (B), or the converse procedure is adopted. In a preferred embodiment of the invention, however, the copolymer (A) is first prepared and then the copolymer (B). The two components give a homogeneous mixture. Dispersions produced from two copolymers (A) and (B) which are prepared separately and then mixed generally have disadvantageous performance characteristics, for example poorer stability and less advantageous flow behavior. Furthermore, mixing would necessitate an additional operation.

The amount of component A is 30–90, preferably 40–85, particularly preferably 50–75, % by weight, based on the total amount of the solution copolymers A and B.

Either the solutions of the completely polymerized copolymers (A) and (B) are converted into aqueous dispersions by mixing with ammonia and dilution with water, or the completely polymerized copolymer solution is slowly stirred into an aqueous ammonia solution to give a dispersion. The organic solvent is distilled off from the resulting dispersions, and the solvent can be recovered. The resulting mixture of the solution copolymers (A) and (B), which is dispersed in water, generally contains less than 2, preferably less than 1, % of its weight of organic solvents of the abovementioned types.

The degree of neutralization of the solution polymer (A +B) mixture is generally from 10 to 150%, preferably from 15 to 100%, in particular from 40 to 70%. The pH of the mixture of polymers (A) and (B) which is dispersed in water is frequently from 6.8 to 10, preferably from 7 to 9. A small proportion, advantageously not more than 25, preferably not more than 10, mol % of the ammonia required for neutralization can be replaced by organic amines, in particular triethylamine, in order to achieve certain effects. Such additives may have an adverse effect on the water resistance of the dispersion films.

When the novel process is carried out in practice, the monomers (a), (b) and (c) are generally added all at once or a little at a time to the aqueous dispersion of the copolymers (A) and (B) which contains a polymerization initiator, and polymerization is carried out at elevated temperatures, advantageously at from 50° to 90° C. However, it is also possible for the mixture of the aqueous dispersion of the copolymers (A) and (B), the monomers (a) to (c), the polymerization initiator and the water-soluble salt to be metered into the polymerization vessel a little at a time during the polymerization. The amount of preformed copolymers A and B is 20–80, preferably 30–70, particularly preferably 45–60, % by weight, based on the sum of the weights of all the monomers and the copolymers.

Suitable polymerization initiators are all conventional free radical initiators. Essentially waterinsoluble initiators, in particular organic peroxides, especially tert-butyl per-2-ethylhexanoate and tert-butyl perpivalate, are preferred. The use of initiators which decompose to form hydrophilic groups, which are incorporated into the polymer, has an adverse effect on the water resistance of the films obtainable from the novel dispersions and is therefore generally not advantageous.

In the novel process, in general from 0.5 to 5, preferably from 1 to 2, % by weight, based on the weight of the solution copolymers (A) and (B), of water-soluble salts are advantageously added to the aqueous medium of the polymerization mixture, in particular before the addition of the monomers (a) to (c). The added electrolyte reduces the viscosity of the mixture and that of the ready-prepared dispersion and thus permits the preparation of dispersions having relatively high polymer contents. Moreover, the addition of the electrolyte surprisingly improves the polymerization conversion and the leveling properties of the films produced from the dispersions.

Suitable water-soluble salts include a large number of inorganic and organic salts. The ammonium salts of carboxylic acids and carbon dioxide are preferred. Examples of such salts are ammonium, sodium and potassium chloride, sulfate, acetate, benzoate, carbonate and bicarbonate.

Since the mixture of the solution copolymers (A) and (B) which is dispersed in water already contains ammonia, it is also possible for the carboxylic acid or carbon dioxide, with or without additional ammonia, simply to be added to the aqueous dispersion of the copolymers (A) and (B). Benzoic acid is particularly preferably added.

If the solution copolymers (A) and (B) contain monomers (IV) as copolymerized units, it is advantageous if the films produced from the dispersions are crosslinked with polyhydrazides. The addition of polyhydrazides to the novel dispersions is only useful in this case. Suitable polyhydrazides are, for example, dihydrazides of organic di- or oligocarboxylic acids. Examples are malonic acid dihydrazide, succinic acid dihydrazide, glutaric acid dihydrazide, adipic dihydrazide, pivalic acid dihydrazide, suberic acid dihydrazide, azelaic acid dihydrazide, sebacic acid dihydrazide, decanedioic acid dihydrazide, dodecanedioic acid dihydrazide, tridecanedioic acid dihydrazide, tetradecanedioic acid dihydrazide, pentadecanedioic acid dihydrazide, hexadecanedioic acid ci-hydrazide, 2-methyltetradecanedioic acid dihydrazide, methyl-, ethyl-, propyl-, butyl-, hexyl-, heptyl-, octyl-, 2-ethylhexyl-, nonyl-, decyl-, undecyl- and do-decylmalonic acid dihydrazide, methyl-, ethyl-, propyl-, butyl-, hexyl-, heptyl- and octylsuccinic acid dihydraz-ide, 2-ethyl-3-propylsuccinic and -glutaric acid di-hydrazide, cyclohexanedicarboxylic acid dihydrazide, cyclohexylmethyl malonic acid dihydrazide, terephthalic acid dihydrazide, phenylsuccinic acid dihydrazide, cinnamylmalonic acid dihydrazide, benqylmalonic acid dihydrazide, pentane-1,3,5-tricarboxylic acid trihydrazide, hex-4-ene-1,2,6-tricarboxylic acid trihydrazide, 3-cyanopentane-1,3,5-tricarboxylic acid trihydrazide and dicyanofumaric acid dihydrazide, and the di-and oligohydrazides of dimerized and oligomerized unsaturated fatty acids. Adipic acid dihydrazide is preferred.

The polyhydrazide can be added to the polymer dispersions prepared according to the invention advantageously in solid form or as an aqueous solution or suspension and can be stirred, and is preferably used in an amount of from 0.1 to 1 equivalent of polyhydrazide per equivalent of carbonyl groups present in the dispersion.

The aqueous polymer dispersions prepared according to the invention can be processed using a conventional application unit; the viscosity can be adapted to the particular application system by thickening with a commercial thickener or dilution with water.

The novel dispersions are suitable for the production of protective and/or decorative coatings on hard and soft substrates, e.g. metal, leather, paper and/or plastics.

In the Examples which follow, parts and percentages are by weight. The light transmittance values (LT values) stated therein apply to 2.5 cm thick layers of the dispersions diluted to a solids content of 0.01% by weight, at room temperature.

EXAMPLE 1

Preparation of the mixture of the solution copolymers (A) and (B), dispersed in water:

(a) Preparation of copolymer $(A)_1$:

384 parts of toluene are initially taken in a conventional polymerization apparatus and heated to 110° C. Thereafter, mixture I, consisting of 363 parts of methyl methacrylate, 252 parts of n-butyl acrylate, 35 parts of diacetoneacrylamide, 50 parts of acrylic acid, 4 parts of tert-butyl perbenzoate, 4 parts of tert-butyl per-2-ethylhexanoate and 40 parts of toluene, is metered in uniformly in the course of 3 hours at from 107° to 110° C., and polymerization is continued for a further 2 hours at 110° C..

(b) Preparation of copolymer $(B)_1$:

Mixture II, consisting of 177 parts of methyl methacrylate, 108 parts of n-butyl acrylate, 15 parts of diacetoneacrylamide, 1.33 parts of tert-butyl perbenzoate, 1.33 parts of tern-butyl per-2-ethylhexanoate and 13.3 parts of toluene, is metered into the polymer solution described under (a), in the course of 1 hour at from 107° to 110° C. Polymerization is then continued for a further 3 hours at 110° C., and 240 parts of toluene are added during this procedure.

(c) Preparation of the aqueous dispersion of the copolymers $(A)_1$ and $(B)_1$:

42.5 parts of 25% strength aqueous ammonia solution are stirred at 70° C. into the polymer solution described under (b), followed by 1,500 parts of water. 1,040 parts of a toluene/water mixture are then distilled off under reduced pressure, with the addition of further water.

A finely divided secondary dispersion having a solids content of 32.2%, a LT value of 97 and a residual toluene content of 0.4% by weight is obtained.

(d) Polymerization of the monomers (a) to (c)

Mixture III, consisting of 750 parts of the copolymer mixture described under (c) and dispersed in water, 90 parts of water, 1.5 parts of 25% strength aqueous ammonia solution, 133 parts of methyl methacrylate, 117 parts of n-butyl acrylate, 10 parts of hexane-1,6-diol diacrylate, 5 parts of tert-butyl per-2-ethylhexanoate and 2.5 parts of benzoic acid, is heated to 80° C. and stirred for 4 hours at this temperature. A stable dispersion having a solids content of 45.7% and an LT value of 88 is obtained. 4.6 parts of adipic acid dihydrazide are also stirred into the dispersion.

COMPARATIVE EXPERIMENT 1

The procedure is similar to that in Example 1a. The resulting copolymer $(A)_1$ is dispersed in water similarly to Example 1c. The copolymer $(A)_1$ dispersed in water thus does not contain the component $(B)_1$. In contrast to Example 1, removal of toluene by distillation is very greatly hindered by pronounced foaming. The dispersion has a solids content of 28.4% and an LT value of 100.

The polymerization of the monomers (a) to (C) is carried out similarly to Example 1d, except that the monomers of the mixture II are also added to the monomer mixture III. The resulting copolymer dispersion then has the same monomer composition and the same solids content as the dispersion of Example 1. Comparison of the copolymer dispersion of Example 1 with that of Comparative Experiment 1

| | Dispersion of Example 1 | Dispersion of Comparative Experiment 1 |
| --- | --- | --- |
| Solids content | 45.7% | 44.8% |
| pH | 7.5 | 7.5 |
| Coagulate content | 0.05% | 0.3% |
| LT value | 84 | 82 |
| Viscosity | 250 mPa.s | 400 mPa.s |
| Viscosity of 35% strength solution after the addition of 1% $NH_3$ (pH = 9.0) | 500 mPa.s | 2100 mPa.s |
| Pendulum hardness of the film (50 μm film thickness) according to DIN 53,157 | 74 s | 73 s |
| Appearance of the 50 μm thick film | Clear, glossy | Somewhat dull |
| Water absorption of the film after storage in water for 7 days, based on the film weight | 6% | 7% |

The copolymer dispersion from Comparative Experiment 1 thus has the following disadvantageous properties compared with the copolymer dispersion of Example 1, prepared according to the invention:
Higher coagulate content
Higher viscosity,
More pronounced dependence of the viscosity on the pH,
Lower gloss of the film and
Increased water absorption.

COMPARATIVE EXPERIMENT 2

The procedure is similar to that in Comparative Experiment 1, except that the addition of the ammonia solution and of the benzoic acid is dispensed with. A reaction time of 4 hours at 80° C. is required before the conversion of the polymerization (determined from the solids content) has reached 77%; even after the addition of a further 5 parts of tert-butyl per-2-ethylhexanoate and reaction for a further 4 hours at 80° C., the conversion is still not complete. The dispersion gives opaque films. The coagulate content is substantially higher than in Comparative Experiment 1.

COMPARATIVE EXPERIMENT 3

The procedure is similar to that in Example 1, except that the mixtures I and II are polymerized together. The resulting copolymer has the same monomer composition as the copolymer mixture stated under Examples 1b but, instead of consisting of the components $(A)_1$ and $(B)_1$, has a homogeneous composition.

Dispersing the resulting copolymer solution in water gives an unstable dispersion which coagulates when an attempt is made to distill off the toluene.

COMPARATIVE EXPERIMENT 4

Comparative Experiment 1 is repeated. A dispersion having a coagulate content of more than 2% by weight and giving a highly specked film is formed.

This Experiment shows the inadequate reproducibility of the preparation of the dispersion when the novel component B is dispensed with.

EXAMPLE 2

The procedure is similar to that of Example 1d, except that, instead of the 25 parts of benzoic acid, 1.55 parts of potassium chloride are added before the polymerization of the monomers (a) to (c). The solids content of the resulting copolymer dispersion is 45.2% and the LT value is 68.

EXAMPLE 3

A mixture is prepared from 1,500 parts of the mixture of copolymers $(A)_1$ and $(B)_1$ stated in Example 1c, 180 parts of water, 3 parts of 25% strength aqueous ammonia solution, 234 parts of methyl methacrylate, 234 parts of n-butyl acrylate, 52 parts of styrene, 10 parts of tert-butyl per-2-ethylhexanoate and 5 parts of benzoic acid. 20% of the mixture are initially taken and heated to 80° C. The remainder of the mixture is added to the stirred polymerization mixture in the course of 2 hours at 80° C. Polymerization is then continued for a further 4 hours at 80° C. A copolymer dispersion having a solids content of 45.2% and an LT value of 73 is obtained.

EXAMPLE 4

The procedure is similar to that of Example 1, except that, instead of diacetoneacrylamide, the corresponding amount of n-butyl acrylate is used in the preparation of the copolymers $(A)_1$ and $(B)_1$. Accordingly, no adipic acid dihydrazide is added to the ready-prepared dispersion.

EXAMPLE 5

The procedure is similar to that of Example 1, except that mixtures I and II having the following compositions are used:
Mixture I:
293 parts of methyl methacrylate, 245 parts of n-butyl acrylate, 42 parts of diacetoneacrylamide, 50 parts of acrylic acid, 70 parts of acrylonitrile, 4 parts of tert-butyl perbenzoate, 4 parts of tert-butyl per-2-ethylhexanoate and 40 parts of toluene.
Mixture II:
147 parts of methyl methacrylate, 105 parts of n-butyl acrylate, 18 parts of diacetoneacrylamide, 30 parts of acrylonitrile, 2 parts of tert-butyl perbenzoate, 2 parts of tert-butyl per-2-ethylhexanoate and 20 parts of toluene.
Mixture III:
743 parts of dispersed copolymer mixture $(A)_5$ and $(B)_5$ (solids content 32.3%), 90 parts of water, 72 parts of methyl methacrylate, 72 parts of n-butyl acrylate, 16 parts of divinylbenzene, 4 parts of tert-butyl per-2-ethylhexanoate, 2 parts of benzoic acid and 1.35 parts of 25% strength aqueous ammonia solution.

The ready-prepared copolymer dispersion has a solids content of 40.8% and an LT value of 72. 4.1 parts of adipic acid dihydrazide are added to it.

On drying at room temperature, the dispersions from Examples 1 to 5 give clear glossy films having high water resistance. The film obtained from the dispersion of Example 4 can readily be dissolved again with organic solvents, but the remaining films cannot.

We claim:

1. A process for the preparation of a surfactant and protective colloid-free aqueous polymer dispersion by free radical polymerization of
   (a) from 50 to 100%, based on the total weight of the monomers, of $C_1$-$C_{20}$-alkyl (meth)acrylates,
   (b) from 0 to 20%, based on the total weight of the monomers, of polyolefinically unsaturated monomers and and from 10 to 70% by weight of the mixture of a solution copolymer (B) obtained from 40–100%, based on its weight, of monomers (II) and 0–60%, based on its weight, of monomers (III) to (V), where the sum of monomers (II)–(V) is 100 wt. %, are used as the preformed copolymers, wherein the viscosity, particle size distribution, freedom from coagulates, gloss and leveling properties of films produced from said aqueous polymer dispersion can be substantially better reproduced than when dispersions not containing copolymer (B) are used.

2. A process for the preparation of a polymer dispersion as claimed in claim 1, wherein the mixture of the solution copolymers (A) and (B) is prepared by a method in which one of the two components (A) and (B) is first prepared in an organic solvent and the other component is then prepared in the resulting polymer solution, and the solution containing the copolymers (A) and (B) is dispersed in water with the addition of ammonia, and the organic solvent is then distilled off.

3. A process for the preparation of an aqueous polymer dispersion as claimed in claim 1, wherein a free radical initiator which is essentially insoluble in water is used to initiate the polymerization of the monomers (a) to (c).

4. A process for the preparation of an aqueous polymer dispersion as claimed in claim 1, wherein from 0.5 to 5% by weight, based on the weight of the solution polymers (A) and (B), of water-soluble salts are added to the polymerization medium.

* * * * *